United States Patent [19]

Tsuchiya et al.

[11] Patent Number: 5,196,971
[45] Date of Patent: Mar. 23, 1993

[54] TAPE LOADING MECHANISM FOR USE IN MAGNETIC RECORDING/REPRODUCING APPARATUS HAVING TAPE CONTROL FEATURES FOR PREVENTING DAMAGE TO TAPE

[75] Inventors: Yuzo Tsuchiya; Toshiaki Tanaka, both of Fukaya, Japan

[73] Assignee: Kabushiki Kaisha Toshiba, Kawasaki, Japan

[21] Appl. No.: 801,592

[22] Filed: Dec. 5, 1991

Related U.S. Application Data

[63] Continuation of Ser. No. 457,967, Dec. 27, 1989, abandoned.

[30] Foreign Application Priority Data

Dec. 28, 1988 [JP] Japan ................................. 63-333589

[51] Int. Cl.⁵ ............................................. G11B 5/027
[52] U.S. Cl. ......................................... 360/85; 360/95; 360/130.23
[58] Field of Search ............. 360/85, 95, 130.2, 130.21, 360/130.22, 130.23, 130.3, 130.31, 130.32

[56] References Cited

U.S. PATENT DOCUMENTS

| | | | |
|---|---|---|---|
| 4,059,245 | 11/1977 | Hirose | 242/201 |
| 4,060,840 | 11/1977 | Umeda | 360/130.23 |
| 4,122,506 | 10/1978 | Kubo et al. | 360/130.23 |
| 4,133,497 | 1/1979 | Rothlisberger | 242/200 |
| 4,264,937 | 4/1981 | Kabacinski | 360/130.23 X |
| 4,319,292 | 3/1982 | Katoh | 360/96.5 |
| 4,370,682 | 1/1983 | Katoh | 360/71 |
| 4,423,445 | 12/1983 | Okada et al. | 360/96.5 |
| 4,511,940 | 4/1985 | Yamaguchi et al. | 360/96.6 |
| 4,577,246 | 3/1986 | Matsuki | 360/96.5 |
| 4,628,383 | 12/1986 | Miyamoto | 360/96.5 |
| 4,642,714 | 2/1987 | Miyamoto | 360/96.5 |
| 4,704,643 | 11/1987 | Matsuoka et al. | 360/71 |
| 4,723,177 | 2/1988 | Ahn | 360/96.5 |
| 4,739,424 | 4/1988 | Yamada et al. | 360/96.5 |
| 4,768,113 | 8/1988 | Sato | 360/96.5 |
| 4,809,100 | 2/1989 | Tanaka et al. | 360/96.5 |
| 4,825,322 | 4/1989 | Kunze | 360/96.3 |
| 4,851,938 | 7/1989 | Inami | 360/96.5 X |
| 4,858,042 | 8/1989 | Ito et al. | 360/96.5 |
| 4,918,549 | 4/1990 | Katono et al. | 360/93 |
| 4,930,720 | 6/1990 | Hwang | 242/198 |

FOREIGN PATENT DOCUMENTS

| | | |
|---|---|---|
| 0177026 | 2/1985 | European Pat. Off. . |
| 0177133 | 4/1986 | European Pat. Off. . |
| 0219041 | 7/1986 | European Pat. Off. . |
| 0203306 | 12/1986 | European Pat. Off. . |
| 0240922 | 10/1987 | European Pat. Off. . |
| 0293047 | 11/1988 | European Pat. Off. . |
| 55-113165 | 9/1980 | Japan . |
| 58-164050 | 9/1983 | Japan . |
| 61-210552 | 9/1986 | Japan . |
| 2181610 | 4/1987 | United Kingdom . |

OTHER PUBLICATIONS

Patent Abstracts of Japan, vol. 8, No. 001, Jan. 6, 1984, Manabu, Cassette Loading Device.
Patent Abstacts of Japan, vol. 9, No. 127, May 31, 1985, Katouno, Cassette Loading Device.
Patent Abstracts of Japan, vol. 9, No. 58, Mar. 14, 1985 Ozawa, Cassette Carrier.
Patent Abstracts, vol. 8, No. 175, Aug. 11, 1984, Satoru, Magnetic Disc Device.

*Primary Examiner*—Andrew P. Sniezek
*Attorney, Agent, or Firm*—Cushman, Darby & Cushman

[57] ABSTRACT

First and second tape-pulling members comprise slanted posts and guide rollers adapted for engagement with the tape contained in a tape cassette. By the slanted posts and guide rollers, the first and second tape-pulling members pull the tape out of the tape cassette. Each of the guide rollers includes a tape-winding portion around which the tape is to be wound. First and second holding members are provided at positions where the tape loading by the first and second tape-pulling members is completed. Tape control portions, by which the tape disengaged from the guide rollers are controlled, are formed on the first and second holding members, respectively, such that they are located on the tape-outlet sides of the guide rollers of the first and second tape-pulling members, i.e., on the side closer to a cylinder. Each of the tape control portions is substantially at the same level as the corresponding tape-winding portions of the guide rollers.

27 Claims, 9 Drawing Sheets

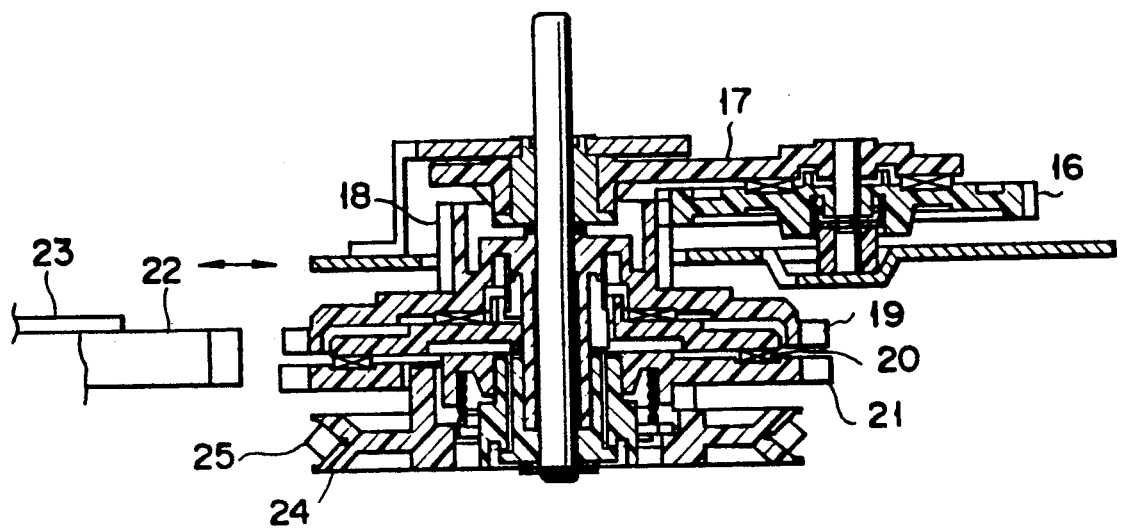
F I G. 2
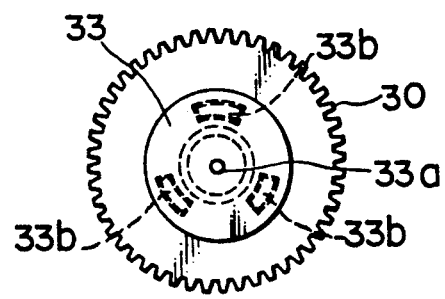
F I G. 4A
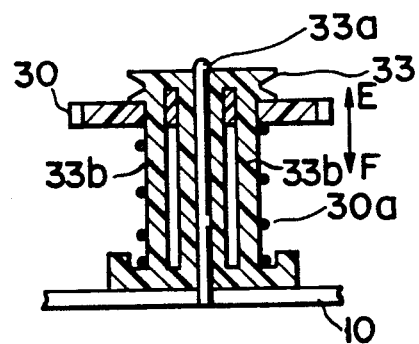
F I G. 4B

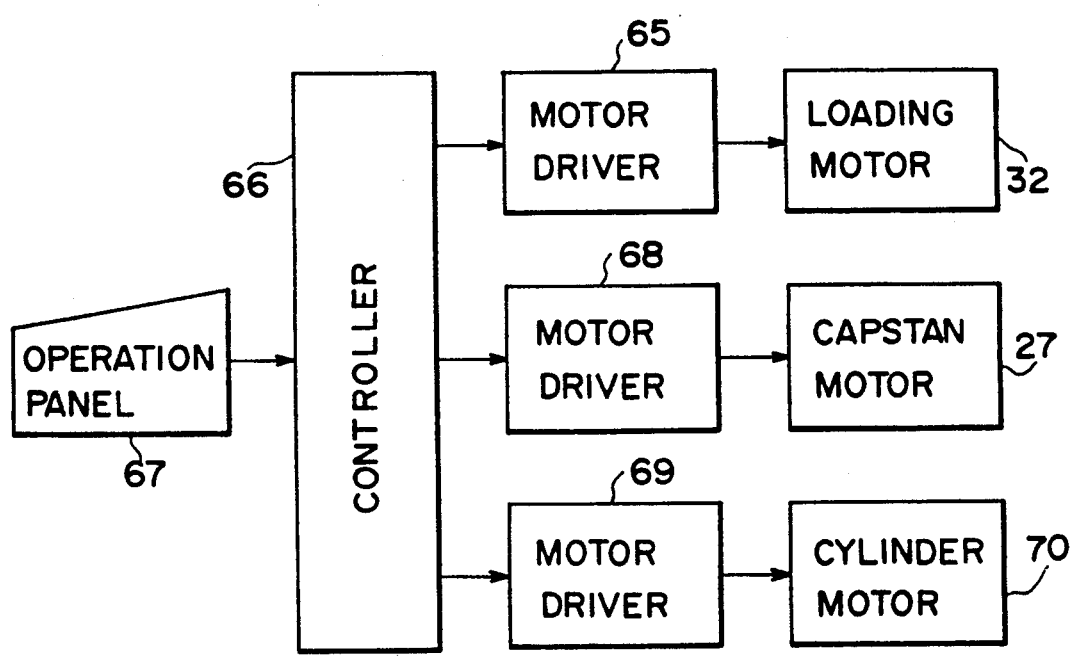
F I G. 6

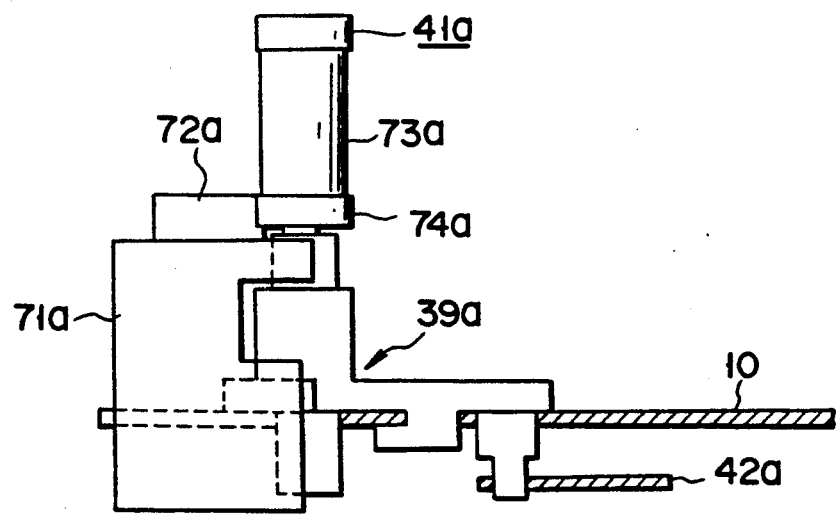
F I G. 7A
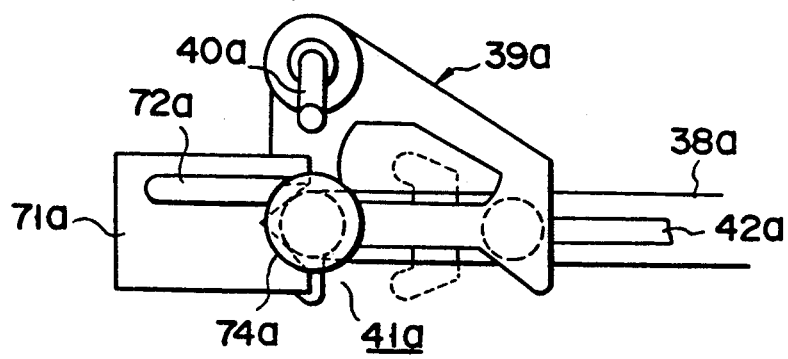
F I G. 7B
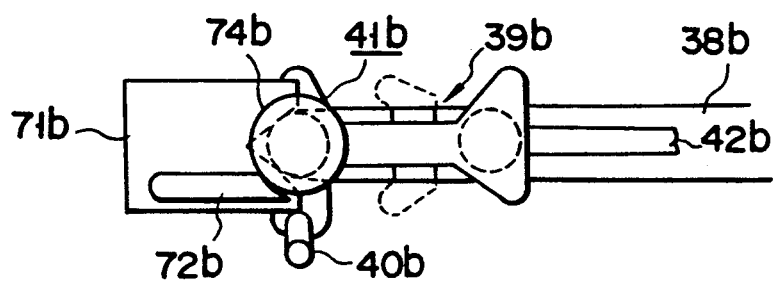
F I G. 7C

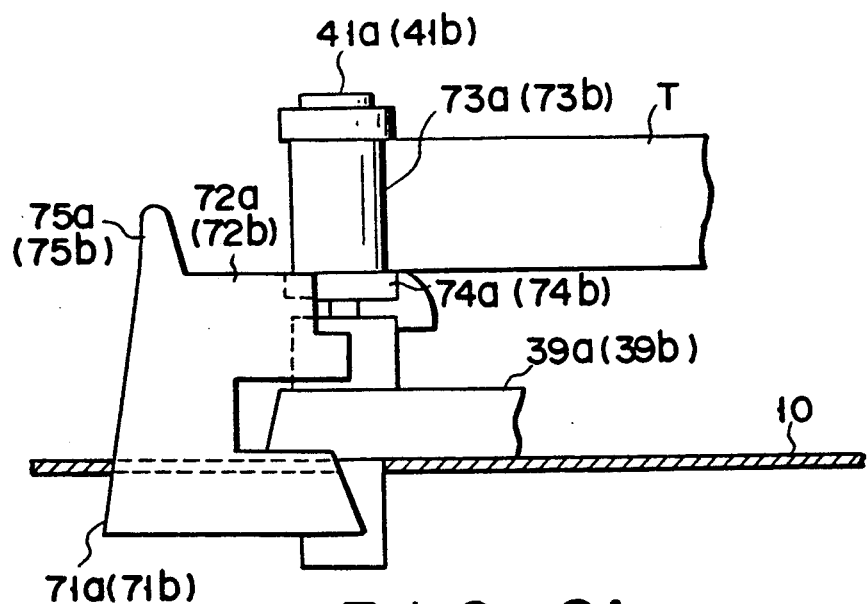
F I G. 8A
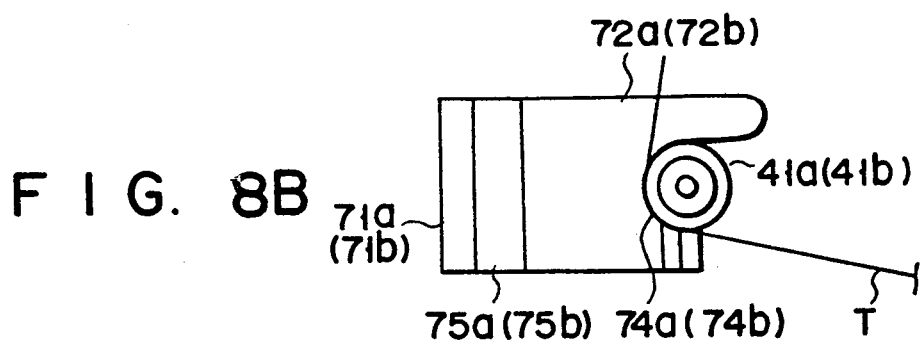
F I G. 8B
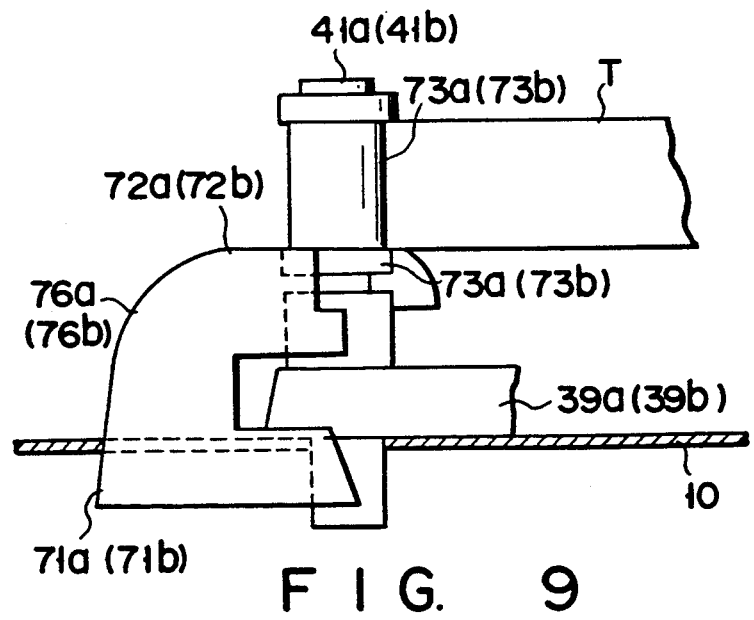
F I G. 9

TAPE LOADING MECHANISM FOR USE IN MAGNETIC RECORDING/REPRODUCING APPARATUS HAVING TAPE CONTROL FEATURES FOR PREVENTING DAMAGE TO TAPE

This is a continuation of application Ser. No. 07/457,967, filed on Dec. 27, 1989, which was abandoned upon the filing hereof.

BACKGROUND OF THE INVENTION

1. Field of the Invention

The present invention relates generally to a magnetic recording/reproducing apparatus, such as a video tape recorder (VTR), and more particularly to a tape-loading mechanism for loading a tape contained in a tape cassette.

2. Description of the Related Art

As is well known, a helical scan VTR is provided with both a front loading mechanism and a tape-loading mechanism. When a video tape cassette containing a video tape is horizontally inserted into the cassette insertion port formed in the front face of the VTR, the front loading mechanism receives and draws the cassette inside, and then lowers the cassette until it comes to the predetermined cassette-loading position. Thereafter, the tape-loading mechanism pulls the tape out of the cassette placed at the cassette-loading position and guides the tape such that it is in contact with about half of the circumference of the rotating cylinder. After the tape-loading mechanism sets the tape along the tape feed path in this way, various operation modes, such as recording, play, freeze (i.e., still image reproduction), slow play, fast-forward play, fast-rewind play, fast forward, and fast rewind, are selectively established with a mode-establishing mechanism and its associated circuits. If an eject key is operated, the tape-loading mechanism draws the tape back into the cassette, and the front loading mechanism returns the cassette from the cassette-loading position to the cassette insertion port.

With respect to this type of magnetic recording/reproducing apparatus, it is demanded that the operation of each mechanism be reliably controlled without complicating the construction and that the operation of the entire apparatus be controlled with high accuracy.

A tape-loading mechanism, which pulls a tape out of a tape cassette by means of a pair of tape-pulling members and brings the tape into contact with a helical scan type cylinder, may be among the mechanisms whose operations should be reliably controlled without complicating the construction. The tape-loading mechanism is required to provide an accurate tape feed path when it has completed the tape loading.

Each tape-pulling members of the tape-loading mechanism has a slanted post and a guide roller, and by means of these the tape-loading mechanism executes the tape loading. With this construction, the tape may slacken and disengage from the tape-winding portions of the guide rollers when the tape loading has been completed. Even if the tape slackens, it is applied with tension and brought into engagement with the tape-winding portions when the driving of the tape is started. At this time, however, the tape strongly contacts the flanges formed at the respective ends of the tape-winding portions, whereby the tape may be damaged. The tape may also be damaged if it is wound around the flanges, not around the tape-winding portions.

SUMMARY OF THE INVENTION

Accordingly, an object of the present invention is to provide a tape-loading mechanism which is adapted for use in a magnetic recording/reproducing apparatus and which is simple in construction and is capable of executing reliable tape loading without causing any tape damage.

This object is achieved by a tape-loading mechanism which comprises:

first and second tape-pulling members which are used for pulling the tape out of a tape cassette and for which slanted posts and guide rollers adapted for engagement with the tape contained in the tape cassette are provided, the guide rollers including tape-winding portions around which the tape is to be wound;

first and second guide means, respectively located in correspondence to tape-inlet and tape-outlet sides of a cylinder, for guiding each of the first and second tape-pulling members between first and second positions, the first position being a position at which the first and second tape-pulling members engage with the tape contained in the tape cassette, and the second position being a position at which the first and second tape-pulling members brings the tape pulled out of the tape cassette into contact with the cylinder;

first and second holding members for holding the first and second tape-pulling members at the second position; and first and second tape control portions which are formed on the first and second holding members, respectively, such that the first and second tape control portions are located at least one of the tape-inlet and tape-outlet sides of the guide rollers of the first and second tape-pulling members, and which control the tape disengaged from the guide rollers, the first and second tape control portions being at a level corresponding to that of the tape-winding portions of the guide rollers.

BRIEF DESCRIPTION OF THE DRAWINGS

FIG. 2 is a sectional view of a clutch gear mechanism;

FIGS. 4A and 4B are top and bottom views, respectively, illustrating both a pulley and a vertically-movable gear;

FIG. 6 is a block circuit diagram of the electric circuit of the VTR;

FIG. 7A is a front view of a tape control portion employed in the first embodiment;

FIGS. 7B and 7C are plan views of the tape control portions employed in the first embodiment;

FIGS. 8A and 8B are front and plan views, respectively, of a tape control portion employed in the second embodiment of the present invention; and FIG. 9 is a front view of a tape control portion employed in the third embodiment of the present invention.

DETAILED DESCRIPTION OF THE PREFERRED EMBODIMENTS

Embodiments of the present invention will now be described, with reference to the accompanying drawings.

Figure 1A:
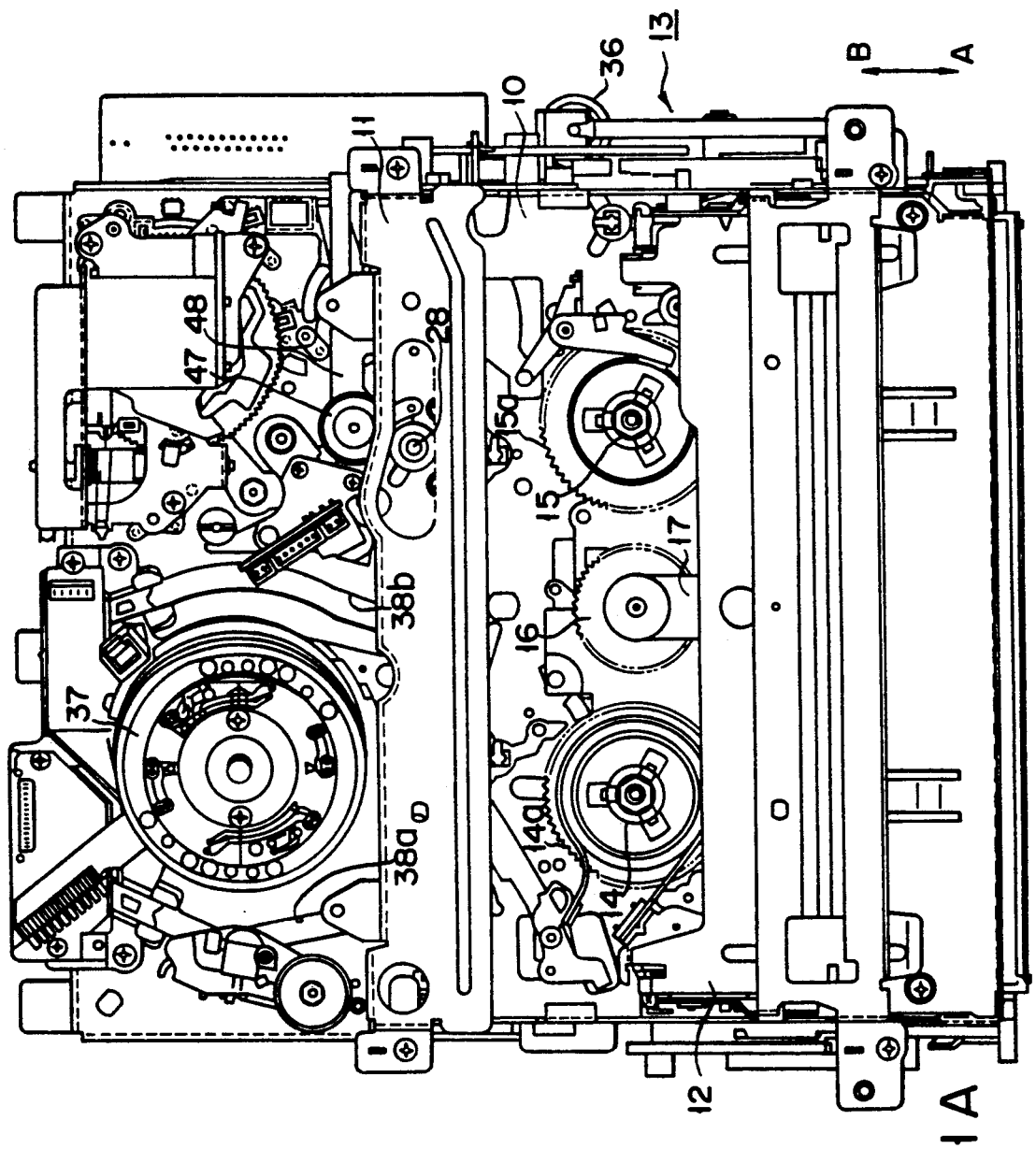
FIGS. 1A–1C are top, side and bottom views, respectively, of a VTR which incorporates the tape-loading mechanism according to the first embodiment of the present invention.
Figure 1B:
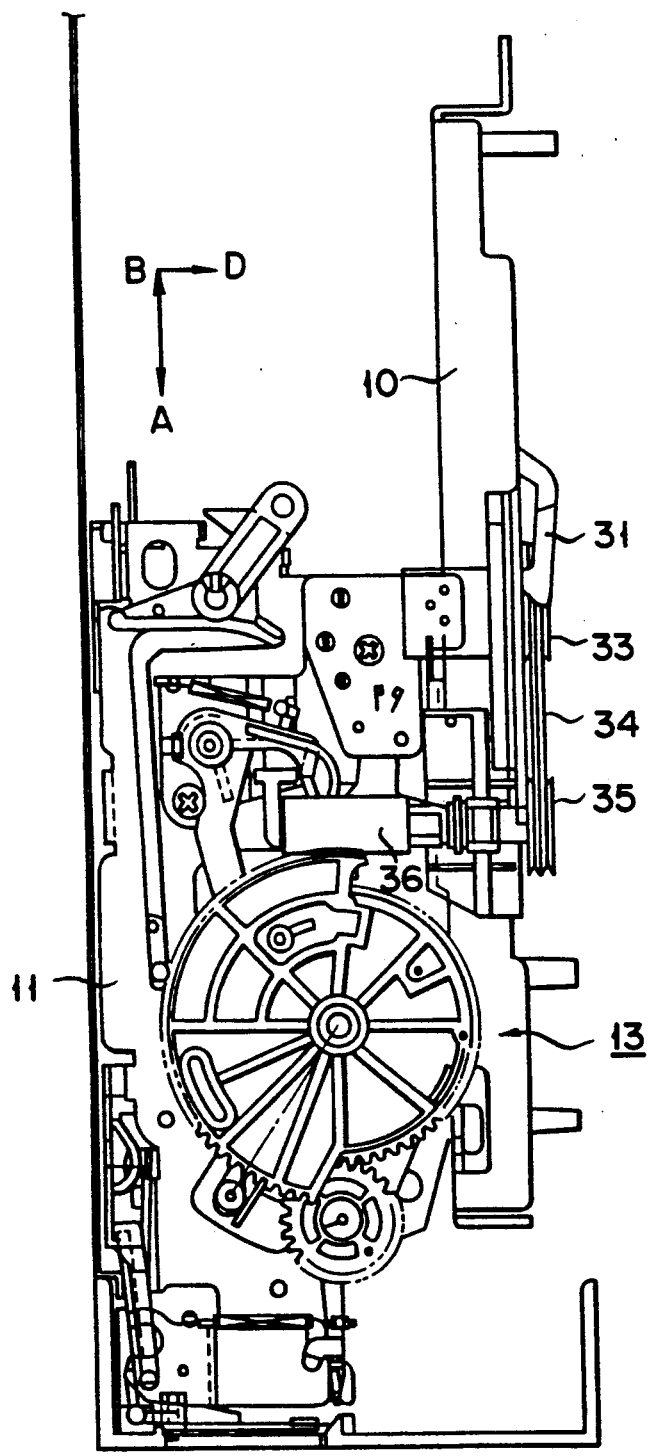
Figure 1C:
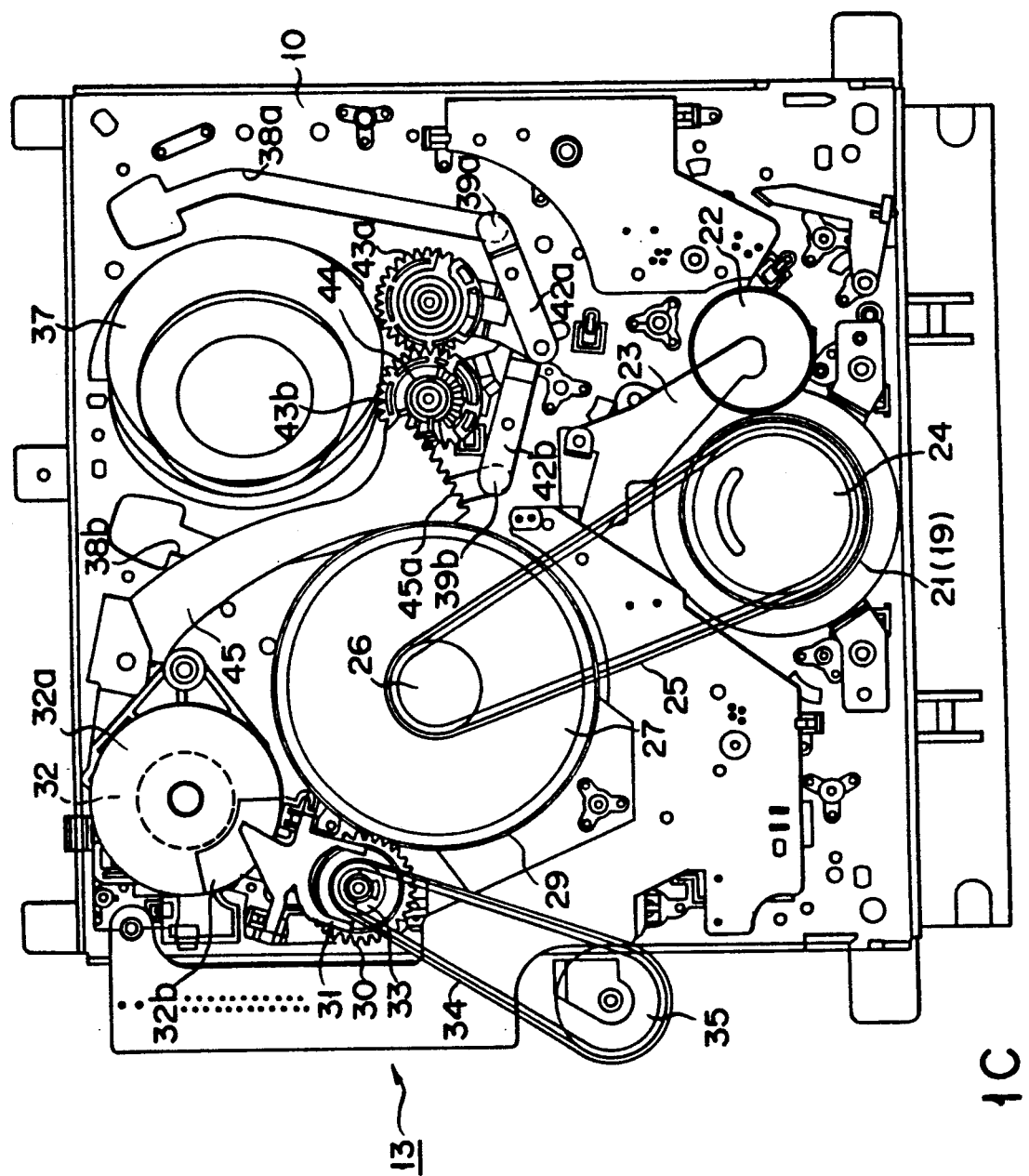

FIGS. 1A, 1B and 1C are top, side and bottom views, respectively, of a tape-loading mechanism employed in the magnetic recording/reproducing apparatus according to the first embodiment of the present invention. Referring to the Figures, frame member 11 is coupled to one end of main chassis 10. Cassette holder 12 is supported by frame member 11 such that it is movable in the directions indicated by arrows A, B and D (the direction indicated by arrow D is perpendicular to the directions indicated by arrows A and B). Cassette holder 12 is adapted to receive cassette C (which is not shown in FIGS. 1A, 1B and 1C, for simplicity) when it is located at the cassette insertion port. In response to the insertion of cassette C into cassette holder 12, front loading mechanism 13 is automatically driven. This front loading mechanism moves cassette holder 12 in direction B, together with cassette C inserted therein, until cassette holder 12 reaches a predetermined position. Then, front loading mechanism 13 moves cassette holder 12 in direction D. As a result, cassette C is fitted on supply reel bases 14 and 15, which are parts of a tape-driving mechanism.

Gears 14a and 15a are coupled to reel bases 14 and 15, respectively. Driving gear 16 constituting part of the tape-driving mechanism is located between gears 14a and 15a. This driving gear 16 is supported by one end of swing member 17.

As is shown in FIG. 2, gear 18, which is in mesh with driving gear 16, is attached to the other end of swing member 17. First clutch gear 19, which is part of a clutch gear mechanism, is arranged coaxial with gear 18. Second clutch gear 21, which is also part of the clutch gear mechanism, is stacked upon first clutch gear 19, with friction member 20 interposed therebetween. Clutch-switching gear 22 is arranged in such a manner as to face both gears 19 and 21. Clutch-switching gear 22 can be brought into contact with the first and second clutch gears 19 and 21, and can be moved away from them. Clutch-switching gear 22 is swung by changeover slider 23 (which interlocks with an operation mode-switching mechanism), such that it is selectively brought into mesh with both clutch gears 19 and 21. Pulley 24 is arranged coaxial with second clutch gear 21, and driving belt 25 is wound around pulley 24.

As is shown in FIG. 1C, driving belt 25 is wound around driving pulley 26. This driving pulley 26 is fitted on the rotating shaft of capstan motor 27. Therefore, the driving force of capstan motor 27 is transmitted first to pulley 24 via driving belt 25, and then to second clutch gear 21. Capstan shaft 28 is arranged coaxial with capstan motor 27.

Figure 3:
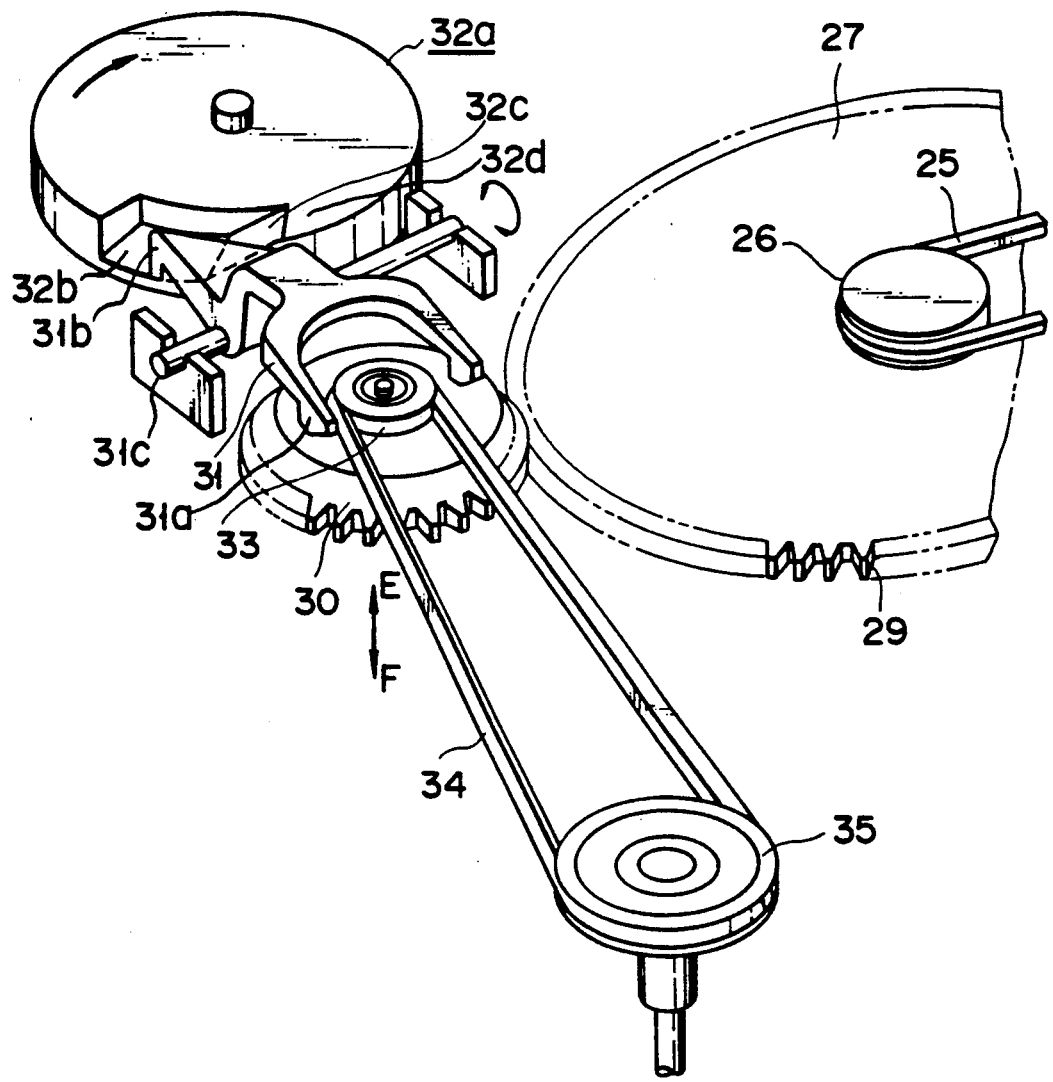
FIG. 3 is a perspective view of a switching mechanism.

As is shown in FIG. 3, driving gear 29 is fitted around the periphery of the rotating member of capstan motor 27. Vertically-movable gear 30 is arranged such that it faces driving gear 29. First end 31a of vertically-swingable switch lever 31 is in contact with the upper side of vertically-movable gear 30. Second end 31b of the switch lever 31 engageable with one side of first mode-switching cam 32a, which is one of the axially-arranged mode-switching cams of the operation mode-switching mechanism.

First mode-switching cam 32a has step portion 32b which is in the form of a circular arc having predetermined size. Slanted portion 32c is formed in that end of step portion 32b which is located downstream with reference to the rotating direction of first mode-switching cam 32a. Slanted portion 32c is formed in such a manner that step portion 32b is smoothly connected to surface 32d of first mode-switching cam 32a.

With this construction, second end 31b of switch lever 31 engages with one of step portion 32b, slanted portion 32c and surface 32d of first mode-switching cam 32a in accordance with the rotation of this cam 32a. As a result of this engagement, first end 31a of switch lever 31 swings in the axial direction of vertically-movable gear 30, with rotatable shaft 31c as a center of swing.

As is shown in FIGS. 4A and 4B, vertically-movable gear 30 is coaxial with pulley 33, and this pulley 33 is coupled to main chassis 10 such that it is rotatable around shaft 33a. Vertically-movable gear 30 is located around pulley 33 and is urged toward pulley 33 in the axial direction of shaft 33a by spring 30a. The rotation of vertically-movable gear 30 is transmitted to pulley 33 through stop members 33b. That is, vertically-movable gear 30 and pulley 33 are rotatable in the same direction.

Driving belt 34 is wound around both pulley 33 and pulley 35. As is shown in FIG. 1C, pulley 35 is coaxial with worm 36 of front loading mechanism 13.

At the time of loading tape cassette C, second end 31b of switch lever 31 engages with step portion 32b, due to the rotation of first mode-switching cam 32a. Therefore, first end 31a of switch lever 31 is separated from vertically-movable gear 30. As a result, vertically-movable gear 30 is raised (in the direction E) by the urging force of spring 30a and brought into mesh with driving gear 29. Thus, the rotation of capstan motor 27 is transmitted to front driving mechanism 13 through vertically-movable gear 30, pulley 33, driving belt 34, pulley 35 and worm 36, whereby front driving mechanism 13 performs the loading of cassette holder 12.

When the loading of cassette C is completed, first mode-switching cam 32a is rotated, and second end 31b of switch lever 31 engages with surface 32d after sliding along slanted portion 32c. Therefore, first end 31a of switch lever 31 contacts vertically-movable gear 30 and pushes this gear downward. As a result, vertically-movable gear 30 is moved downward in the direction F in spite of the urging force of spring 30a. Thus, the rotation of pulley 33 is stopped, and the loading of cassette holder 12 is stopped, accordingly.

Loading motor 32 is designed to drive not only first mode-switching cam 32a mentioned above but also the other mode-switching cams.

As is shown in FIG. 1A, helical scan type cylinder 37 having magnetic heads (not shown) is rotatably coupled to main chassis 10 mentioned above. Around this cylinder 37, first and second guide holes 38a and 38b (which are parts of a tape-loading mechanism) are provided such that the two guide holes correspond in location to the tape inlet and outlet sides, respectively.

Figure 5A:
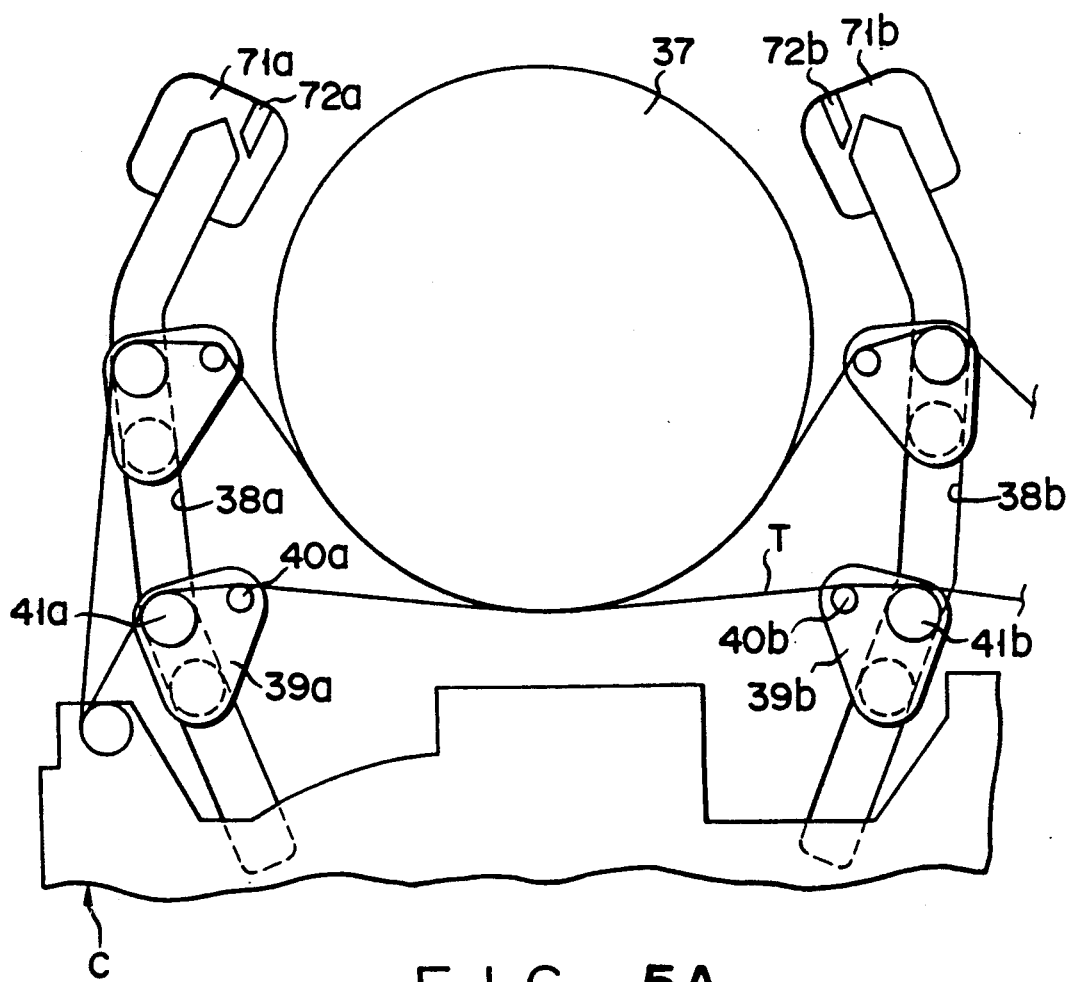
FIGS. 5A and 5B are top and bottom views, respectively, illustrating a tape-loading mechanism.

As is shown in FIG. 5A, first and second tape-pulling members 39a and 39b are fitted in first and second guide holes 38a and 38b, respectively, such that they are movable within the guide holes. Slanted post 40a substantially parallel to cylinder 37 and guide roller 41a substantially perpendicular to main chassis 10 are provided for first tape-pulling member 39a such that they are located side by side with reference to each other. Likewise, slanted post 40b substantially parallel to cylinder 37 and guide roller 41b substantially perpendicular to main chassis 10 are provided for second tape-pulling member 39b such that they are located side by side with reference to each other.

Figure 5B:
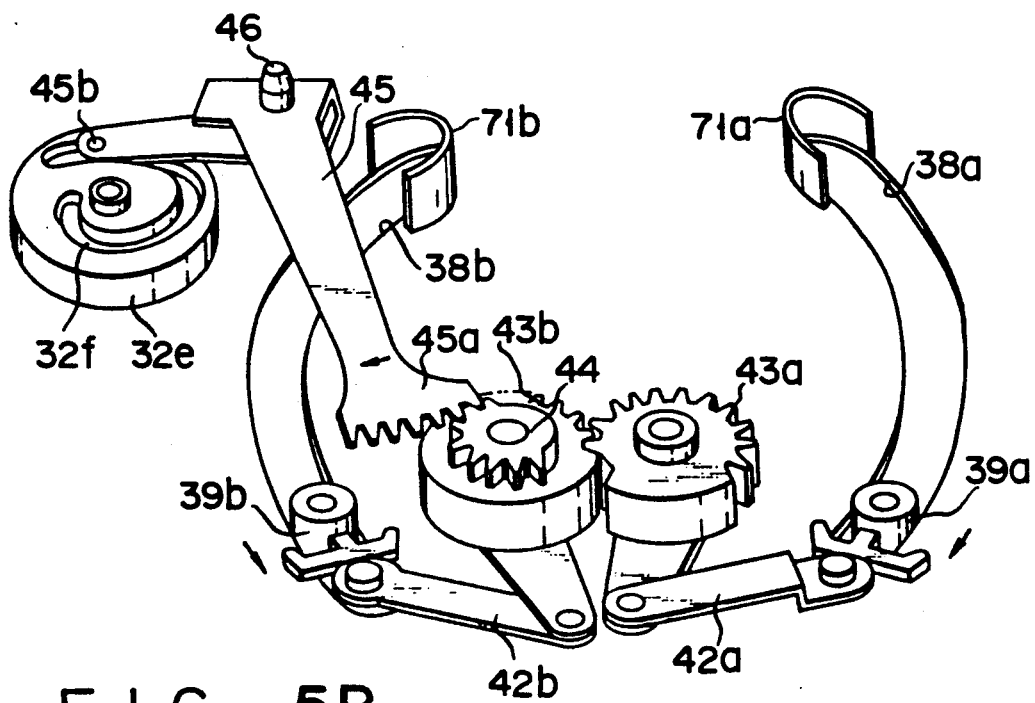

As is shown in FIG. 5B, the one-end portions of first and second links 42a and 42b are coupled to the proximal ends of first and second tape-pulling members 39a and 39b, respectively. The other-end portions of first and second links 42a and 42b are supported by first and second driving gears 43a and 43b, respectively, which are in mesh with each other. Half-gear 44 is arranged coaxial with second driving gear 43b. Sectorial gear 45a formed at one end of driving lever 45 is in mesh with half-gear 44. An intermediate point of driving lever 45 is swingably supported by main chassis 10 by means of shaft 46. Pin 45b located at the other end of driving lever 45 engages with cam groove 32f formed in second mode-switching cam 32e, and this cam 32e is rotated within a predetermined angular range by loading motor 32. Therefore, driving lever 45 is driven by the movement of second mode-switching cam 32e, and transmits the driving force to first and second tape-pulling members 39a and 39b, through half-gear 44, first and second driving gears 43a and 43b, and first and second links 42a and 42b, whereby performing tape loading.

As is shown in FIG. 1A, pinch roller 47, which is part of the tape-driving mechanism, is arranged on main chassis 10 such that it is located in the neighborhood of capstan shaft 28 mentioned above. Pinch roller 47 is swingably supported by one end of pinch lever 48. Pinch lever 48 is swung in association with the above-mentioned mode-switching cams by a linking mechanism (not shown). As a result of the swing of pinch lever 48, pinch roller 47 supported at one end of lever 48 is pressed against capstan shaft 28, with tape T interposed.

First and second mode-switching cams 32a and 32e mentioned above are coaxial with the other mode-switching cams (not shown). All these mode-switching cams are rotated within the same angular range by loading motor 32, and their angles of rotation are determined in accordance with the operation modes of the VTR. As is shown in FIG. 6, loading motor 32 is driven by motor driver 65 under the control of controller 66. In accordance with the user's operation of control panel 67, controller 66 determines an operation mode of the VTR. Controller 66 causes the mode-switching cams to be rotated by the angle corresponding to the determined operation mode. Further, controller 66 controls motor driver 68 in accordance with the determined operation mode, to thereby drive capstan motor 27. The torque of capstan motor 27 is selectively transmitted to capstan shaft 28, reel base 14 located on the tape supply side, reel base 15 located on the tape rewind side, etc. Still further, controller 66 controls motor driver 69 in accordance with the determined operation mode, to thereby drive cylinder motor 70 to rotate cylinder 37.

A description will now be given of a tape-loading mechanism of the present invention applied to the VTR of the above construction. As is shown in FIGS. 5A and 5B, the tape-loading mechanism of the first embodiment of the invention has holding members 71a and 71b, which are normally referred to as catchers, corresponding to first and second tape-pulling members 39a and 39b. Holding members 71a and 71b are provided at the loading completion position of first and second guide holes 38a and 38b of main chassis 10. Tape control portions 72a and 72b extending in such a manner as to intersect the tape path are formed on the upper faces of holding members 71a and 71b, respectively.

The holding members 71a, 71b and the tape control portions 72a, 72b have the constructions shown in FIGS. 7A to 7C. As is shown in these Figures, tape control portions 72a and 72b are provided in correspondence to one side facing cylinder 37 on holding members 71a and 71b. The heights of tape control portions 72a and 72b as measured from holding members 71a and 71b are determined such that their upper surfaces are substantially at the the same level as, or slightly lower than, flanges 74a and 74b formed at the lower end of tape-winding portions 73a and 73b of guide rollers 41a and 41b.

With this construction, even if tape T slackens when it is pulled out of tape cassette C and set in engagement with both the slanted posts 40a, 40b and guide rollers 41a, 41b of the first and second tape-pulling members 39a, 39b, the lower edge of tape T is controlled by tape control portions 72a and 72b such that its desirable posture is maintained. When tape T is tensed next, it is guided to tape-winding portions 73a and 73b of guide rollers 41a and 41b. Since tape control portions 72a and 72b are substantially at the same level of lower flanges 74a and 74b of guide rollers 41a and 41b, tape T is not damaged when it is guided from tape control portions 72a and 72b to tape-winding portions 73a and 73b. In this manner, the tape-loading mechanism of the above construction prevents tape T from being damaged even if tape T slackens. Thus, it is possible to perform tape loading in a reliable manner.

In the tape-loading mechanism mentioned above, tape control portions 72a and 72b are located at downstream points of guide rollers 41a and 41b with reference to the tape feed direction. In other words, tape control portions 72a and 72b are located closer to slanted posts 40a and 40b than guide rollers 41a and 41b, respectively. Needless to say, however, tape control portions 72a and 72b may be provided at upstream points of guide rollers 41a and 41b. Further, they may be provided at both upstream and downstream points of guide rollers 41a and 41b.

FIGS. 8A and 8B are views of tape control portions 72a and 72b employed in the tape-loading mechanism of the second embodiment of the present invention. Since tape control portions 72a and 72b differ from each other merely in their positions relative to respective guide rollers 41a and 41b, only the construction including first tape-pulling member 39a is shown in FIGS. 8A and 8B, for simplicity. As for the construction including second tape-pulling member 39b, the corresponding parts are denoted by the reference numerals enclosed within the parentheses.

Referring to FIGS. 8A and 8B, tape control portion 72a corresponding to first tape-pulling member 39a is integral with holding member 71a. To be more precise, tape control portion 72a is constituted by the upper surface of holding member 71a. In the first embodiment mentioned above, tape control section 72a is located only on one side of guide roller 41a, whereas in the second embodiment, it is constituted by the entire upper surface of holding member 71a and is located on both sides of guide roller 41a. At a position located away from guide roller 41a by a predetermined distance, projection 75a used for guiding tape T is formed on the surface of holding member 71a, i.e., on tape control portion 72a.

Holding member 71b corresponding to second tape-pulling member 39b has tape control portion 72b and projection 75b, which have similar constructions to tape control portion 72a and projection 75a mentioned above.

With this construction, even if tape T slackens when it is pulled out of tape cassette C and set in engagement with both the slanted posts 40a, 40b and guide rollers 41a, 41b of the first and second tape-pulling members 39a, 39b, the lower edge of tape T is controlled by tape control portions 72a and 72b such that its desirable posture is maintained. Even if tape T slackens much, the slack of tape T contacts projections 75a and 75b and is guided thereby, while being controlled by tape control portions 72a and 72b. Therefore, the slack of tape T does not contact structural components (not shown) located in the neighborhood of projections 75a and 75b. Thus, tape T is prevented from being damaged by such structural components. When tape T is tensed next, it is guided to tape-winding portions 73a and 73b of guide rollers 41a and 41b. Since tape control portions 72a and 72b are substantially at the same level of lower flanges 74a and 74b of guide rollers 41a and 41b, tape T is not damaged by flanges 74a and 74b when it is guided from tape control portions 72a and 72b to tape-winding portions 73a and 73b. In this manner, the tape-loading mechanism of the above construction prevents tape T from being damaged even if tape T slackens. Thus, it is possible to perform tape loading in a reliable manner.

FIG. 9 is a view of tape control portions 72a and 72b employed in the tape-loading mechanism of the third embodiment of the present invention. Since tape control portions 72a and 72b differ from each other merely in their positions relative to respective guide rollers 41a and 41b, only the construction including first tape-pulling member 39a is shown in FIGS. 8A and 8B, for simplicity. As for the construction including second tape-pulling member 39b, the corresponding parts are denoted by the reference numerals enclosed within the parentheses.

Referring to FIG. 9, tape control portion 72a corresponding to first tape-pulling member 39a is integral with holding member 71a. To be more precise, tape control portion 72a is constituted by the upper surface of holding member 71a. Slanted portion 76a, which is slanted at a predetermined angle and serves to guide slack of tape T, is formed at that end of tape control portion 72a (i.e., holding member 71a) which is located opposite to guide roller 41a. Holding member 71b corresponding to second tape-pulling member 39b has tape control section 72b and slanted portion 76b similar to those mentioned above.

With this construction, even if tape T slackens when it is pulled out of tape cassette C and set in engagement with both the slanted posts 40a, 40b and guide rollers 41a, 41b of the first and second tape-pulling members 39a, 39b, the lower edge of tape T is controlled by tape control portions 72a and 72b such that its desirable posture is maintained. Even if tape T slackens much, the slack of tape T is guided along slanted portions 76a and 76b, while being controlled by tape control portions 72a and 72b. Therefore, the slack of tape T is does not contact structural components (not shown) located in the neighborhood of slanted portions 72a and 72b. Thus, tape T is prevented from being damaged by such structural components. When tape T is tensed next, it is guided to tape-winding portions 73a and 73b of guide rollers 41a and 41b. Since tape control portions 72a and 72b are substantially at the same level of lower flanges 74a and 74b of guide rollers 41a and 41b, tape T is not damaged by flanges 74a and 74b when it is guided from tape control portions 72a and 72b to tape-winding portions 73a and 73b. In this manner, the tape-loading mechanism of the above construction prevents tape T from being damaged even if tape T slackens. Thus, it is possible to perform tape loading in a reliable manner.

According to the present invention, if tape T pulled out by first and second tape-pulling members 39a and 39b slackens, the slack of tape T is controlled by tape control portions 72a and 72b, as mentioned above. When tape T is tensed thereafter, it is reliably wound around tape-winding portions 73a and 73b of guide rollers 41a and 41b. Therefore, tape T is prevented from being damaged even if it slackens. According to the present invention, moreover, projections 75a and 75b (or slanted portions 76a and 76b) are provided for holding members 71a and 71b, respectively, so as to guide tape T. With this construction, even if tape T pulled out of tape cassette C slackens much and is located greatly away from tape-winding portions 73a and 73b of guide rollers 41a and 41b, the slack of tape T is guided by projections 75a and 75b (or slanted portions 76a and 76b) and is therefore prevented from undesirably contacting the neighboring structural components. Accordingly, tape T is prevented from being damaged even if it slackens much.

The above embodiments were described, referring to the case where the present invention is applied to a VTR. However, the present invention is not limited to this. It can be applied to various types of magnetic recording/reproducing apparatuses, and similar advantages to those mentioned above can be expected in such application as well. In short, the present invention is in no way limited to the above-mentioned embodiments, and can be modified in various ways without departing from the spirit and scope thereof.

What is claimed is:

1. A tape-loading mechanism for pulling a tape out of a tape cassette and bringing the tape into contact with a cylinder used for recording/reproducing information on the tape, the mechanism comprising:
    a first tape-pulling member, provided on a tape inlet side of the cylinder and having a first slanted post and a first guide roller thereon, for pulling the tape out of the tape cassette, the first slanted post and the first guide roller contacting the tape, the first guide roller including a first tape-winding portion, the tape passing around the first tape-winding portion when the tape contacts the first guide roller;
    first guide means, provided on the tape inlet side of the cylinder, for guiding the first tape-pulling member between first and second positions, the first slanted post and the first guide roller of the first-tape pulling member initially contacting the tape contained in the tape cassette at the first position, and the first tape-pulling member bringing the tape pulled out of the tape cassette into contact with the cylinder at the second position;
    a first holding member for holding, at the second position, and the first tape-pulling member guided from the first position by the first guide means;
    first damage preventing means, formed on the first holding member such that the first damage preventing means is positioned relative to at least one of a tape inlet and tape outlet side of the first guide roller of the first tape-pulling member, for preventing the tape from being damaged when the tape falls off of the first guide roller in a slackened state, the first damage preventing means supporting only a lower edge of the tape at a level corresponding to a lower end of the first tape-winding portion of the first guide roller, leaving the other edge and surfaces of the tape unsupported, so that should the tape in a slackened state leave the first guide roller, the lower edge of the slackened tape will rest upon the first damage preventing means;

a second tape-pulling member, provided on a tape outlet side of the cylinder and having a second slanted post and a second guide roller thereon, for pulling the tape out of the tape cassette, the second slanted post and the second guide roller contacting the tape, the second guide roller including a second tape-winding portion, the tape passing around the second tape-winding portion when the tape contacts the second guide roller;

second guide means, provided on the tape outlet side of the cylinder, for guiding the second tape-pulling member between third and fourth positions, the second slanted post and the second guide roller of the second tape-pulling member initially contacting the tape contained in the tape cassette at the third position, and the second tape-pulling member bringing the tape pulled out of the tape cassette into contact with the cylinder at the fourth position;

a second holding member for holding, at the fourth position, the second tape-pulling member guided from the third position by the second guide means; and second damage preventing means, formed on the second holding member such that the second damage preventing means is positioned relative to at least one of a tape inlet and tape outlet side of the second guide roller of the second tape-pulling member, for preventing the tape from being damaged when the tape falls off of the second guide roller in a slackened state, the second damage preventing means supporting only the lower edge of the tape at a level corresponding to a lower end of the second tape-winding portion of the second guide roller, leaving the other edge and surfaces of the tape unsupported, so that should the tape in a slackened state leave the second guide roller, the lower edge of the slackened tape will rest upon the second damage preventing means.

2. The tape-loading mechanism according to claim 1, wherein:
each of the first and second guide rollers includes a flange which defines the lower end of each of the first and second tape-winding portions; and
each of the first and second damage preventing means and each flange are at substantially a same level.

3. The tape-loading mechanism according to claim 2, wherein the first and second damage preventing means have tip ends extending to intersect a tape moving path, the tip end having an upper surface making contact with a lower edge of the tape.

4. The tape-loading mechanism according to claim 2, wherein:
the first damage preventing means is disposed at a most upper surface of the first holding member; and
the second damage preventing means is disposed at a most upper surface of the first holding member.

5. The tape-loading mechanism according to claim 1, wherein:
the first damage preventing means includes a first tape guide portion for guiding a slack portion of the tape, the first tape guide portion being positioned to be at a predetermined distance away from the first guide roller when the first tape-pulling member is in the second position; and
the second damage preventing means includes a second tape guide portion for guiding a slack portion of the tape, the second tape guide portion being positioned to be at a predetermined distance away from the second guide roller when the second tape-pulling member is in the fourth position.

6. The tape-loading mechanism according to claim 5, wherein:
the first tape guide portion includes a first projection formed at that end of a first upper edge of the first tape guide portion which is furthest away from the first guide roller when the first tape pulling member is in the second position; and
the second tape guide portion includes a second projection formed at that end of a second upper edge of the second tape guide portion which is furthest away from the second guide roller when the second tape pulling member is in the fourth position.

7. The tape-loading mechanism according to claim 5, wherein:
the first tape guide portion includes a first slanted portion, the first slanted portion being formed at that end of the first tape guide portion which is closest to the first guide roller when the first tape pulling member is in the second position; and
the second tape guide portion includes a second slanted portion, the second slanted portion being formed at that end of the second tape guide portion which is closest to the second guide roller when the second tape pulling member is in the fourth position.

8. The tape-loading mechanism according to claim 1, wherein:
each of the first and second guide rollers includes a flange which defines the lower end of each of the first and second tape-winding portions; and
each of the first and second damage preventing means is at a level slightly lower than each flange.

9. The tape-loading mechanism according to claim 8, wherein the first and second damage preventing means have tip ends extending to intersect a tape moving path, the tip ends having an upper surface making contact with a lower edge of the tape.

10. The tape-loading mechanism according to claim 8, wherein:
the first damage preventing means is disposed at a most upper surface of the first holding member; and
the second damage preventing means is disposed at a most upper surface of the second holding member.

11. The tape-loading mechanism according to claim 10, wherein:
The first damage preventing means includes a first tape guide portion for guiding a slack portion of the tape, the first tape guide portion being positioned to be at a predetermined distance away from the first guide roller when the first tape pulling member is in the second position; and
the second damage preventing means includes a second tape guide portion for guiding a slack portion of the tape, the second tape guide portion being positioned to be at a predetermined distance away from the second guide roller when the second tape pulling member is in the fourth position.

12. The tape-loading mechanism according to claim 11, wherein:
the first tape guide portion includes a first projection formed at that end of a first upper edge of the first tape guide portion which is furthest away from the first guide roller when the first tape pulling member is in the second position; and
the second tape guide portion includes a second projection formed at that end of a second upper edge of the second tape guide portion which is furthest away from the second guide roller when the second tape pulling member is in the fourth position.

13. The tape-loading mechanism according to claim 11, wherein:
the first tape guide portion includes a first slanted portion, the first slanted portion being formed at that end of the first tape guide portion which is closest to the first guide roller when the first tape pulling member is in the second position; and
the second tape guide portion includes a second slanted portion, the second slanted portion being formed at that end of the second tape guide portion which is closest to the second guide roller when the second tape pulling member is in the fourth position.

14. The tape-loading mechanism according to claim 1, wherein the first and second damage preventing means have tip ends extending to intersect a tape moving path, the tip ends having an upper surface making contact with a lower edge of the tape.

15. The tape-loading mechanism according to claim 1, wherein:
the first damage preventing means is disposed at a most upper surface of the first holding member; and
the second damage preventing means is disposed at a most upper surface of the second holding member.

16. The tape-loading mechanism according to claim 15, wherein:
the first damage preventing means includes a first tape guide portion for guiding a slack portion of the tape, the first tape guide portion being positioned to be at a predetermined distance away from the first guide roller when the first tape pulling member is in the second position; and
the second damage preventing means includes a second tape guide portion for guiding a slack portion of the tape, the second tape guide portion being positioned to be at a predetermined distance away from the second guide roller when the second tape pulling member is in the fourth position.

17. The tape-loading mechanism according to claim 16, wherein:
the first tape guide portion includes a first projection formed at that end of a first upper edge of the first tape guide portion which is furthest away from the first guide roller when the first tape pulling member is in the second position; and
the second tape guide portion includes a second projection formed at that end of a second upper edge of the second tape guide portion which is furthest away from the second guide roller when the second tape pulling member is in the fourth position.

18. The tape-loading mechanism according to claim 16, wherein:
the first tape guide portion includes a first slanted portion, the first slanted portion being formed at that end of the first tape guide portion which is closest to the first guide roller when the first tape pulling member is in the second position; and
the second tape guide portion includes a second slanted portion, the second slanted portion being formed at that end of the second tape guide portion which is closest to the second guide roller when the second tape pulling member is in the fourth position.

19. A tape-loading mechanism for pulling a tape out of a tape cassette and bringing the tape into contact with a cylinder used for recording/reproducing information on the tape, the mechanism comprising:
a first tape-pulling member, provided on a tape inlet side of the cylinder and having a first slanted post and a first guide roller thereon, for pulling the tape out of the tape cassette, the first slanted post and the first guide roller contacting the tape, the first guide roller including a first tape-winding portion, the tape passing around the first tape-winding portion when the tape contacts the first guide roller;
first guide means, provided on the tape inlet side of the cylinder, for guiding the first tape-pulling member between first and second positions, the first slanted post and the first guide roller of the first-tape pulling member initially contacting the tape contained in the tape cassette at the first position, and the first tape-pulling member bringing the tape pulled out of the tape cassette into contact with the cylinder at the second position;
a first holding member for holding, at the second position, and the first tape-pulling member guided from the first position by the first guide means;
first damage preventing means, formed at a most upper portion of the first holding member, for preventing the tape from being damaged when the tape falls off of the first guide roller in a slackened state, the first damage preventing means being positioned relative to at least one of a tape inlet and tape outlet side of the first guide roller and supporting only a lower edge of the tape at a level corresponding to a lower end of the first tape-winding portion of the first guide roller, leaving the other edge and surfaces of the tape unsupported, so that should the tape in a slackened state leave the first guide roller, the lower edge of the slackened tape will rest upon the first damage preventing means, the first damage preventing means comprising a first tip end, extending to intersect a tape moving path, the first tip end having a first upper surface making contact with the lower edge of the tape;
a second tape-pulling member, provided on a tape outlet side of the cylinder and having a second slanted post and a second guide roller thereon, for pulling the tape out of the tape cassette, the second slanted post and the second guide roller contacting the tape, the second guide roller including a second tape-winding portion, the tape passing around the second tape-winding portion when the tape contacts the second guide roller;
second guide means, provided on the tape outlet side of the cylinder, for guiding the second tape-pulling member between third and fourth positions, the second slanted post and the second guide roller of the second tape-pulling member initially contacting the tape contained in the tape cassette at the third position, and the second tape-pulling member bringing the tape pulled out of the tape cassette into contact with the cylinder at the fourth position;

a second holding member for holding, at the fourth position, the second tape-pulling member guided from the third position by the second guide means; and second damage preventing means, formed at a most upper portion of the second holding member, for preventing the tape from being damaged when the tape falls off of the second guide roller in a slackened state, the second damage preventing means being positioned relative to at least one of a tape inlet and tape outlet side of the second guide roller and supporting only the lower edge of the tape at a level corresponding to a lower end of the second tape-winding portion of the second guide roller, leaving the other edge and surfaces of the tape unsupported, so that should the tape in a slackened state leave the second guide roller, the lower edge of the slackened tape will rest upon the second damage preventing means, the second damage preventing means comprising a second tip end, extending to the intersect the tape moving path, the second tip end having a second upper surface making contact with the lower edge of the tape.

20. The tape-loading mechanism according to claim 19, wherein:
each of the first and second guide rollers includes a flange which defines the lower end of each of the first and second tape-winding portions; and
each of the first and second damage preventing means and each flange are at substantially a same level.

21. The tape-loading mechanism according to claim 19, wherein:
the first damage preventing means includes a first tape guide portion for guiding a slack portion of the tape, the first tape guide portion being positioned to be at a predetermined distance away from the first guide roller when the first tape pulling member is in the second position; and
the second damage preventing means includes a second tape guide portion for guiding a slack portion of the tape, the second tape guide portion being positioned to be at a predetermined distance away from the second guide roller when the second tape pulling member is in the fourth position.

22. The tape-loading mechanism according to claim 21, wherein:
the first tape guide portion includes a first projection formed at that end of a first upper edge of the first damage preventing means which is furthest away from the first guide roller when the first tape pulling member is in the second position; and
the second tape guide portion includes a second projection formed at that end of a second upper edge of the second damage preventing means which is furthest away from the second guide roller when the second tape pulling member is in the fourth position.

23. The tape-loading mechanism according to claim 21, wherein:
the first tape guide portion includes a first slanted portion, the first slanted portion being formed at that end of the first tape guide portion which is closest to the first guide roller when the first tape pulling member is in the second position; and
the second tape guide portion includes a second slanted portion, the second slanted portion being formed at that end of the second tape guide portion which is closest to the second guide roller when the second tape pulling member is in the fourth position.

24. The tape-loading mechanism according to claim 19, wherein:
each of the first and second guide rollers includes a flange which defines the lower end of each of the first and second tape-winding portions; and
each of the first and second damage preventing means is at a level slightly lower than each flange.

25. The tape-loading mechanism according to claim 24, wherein:
the first damage preventing means includes a first tape guide portion for guiding a slack portion of the tape, the first tape guide portion being positioned to be at a predetermined distance away from the first guide roller when the first tape pulling member is in the second position; and
the second damage preventing means includes a second tape guide portion for guiding a slack portion of the tape, the second tape guide portion being positioned to be at a predetermined distance away from the second guide roller when the second tape pulling member is in the fourth position.

26. The tape-loading mechanism according to claim 25, wherein:
the first tape guide portion includes a first projection formed at that end of a first tape guide portion which is furthest away from the first guide roller when the first tape pulling member is in the second position; and
the second tape guide portion includes a second projection formed at that end of a second upper edge of the second tape guide portion which is furthest away from the second guide roller when the second tape pulling member is in the fourth position.

27. The tape-loading mechanism according to claim 25, wherein:
the first tape guide portion includes a first slanted portion, the first slanted portion being formed at that end of the first tape guide portion which is closest to the first guide roller when the first tape pulling member is in the second position; and
the second tape guide portion includes a second slanted portion, the second slanted portion being formed at that end of the second tape guide portion which is closest to the second guide roller when the second tape pulling member is in the fourth position.

* * * * *